United States Patent
Kanno et al.

(10) Patent No.: US 6,942,841 B2
(45) Date of Patent: Sep. 13, 2005

(54) PROCESS FOR TREATING FLUORINE COMPOUND-CONTAINING GAS

(75) Inventors: Shuichi Kanno, Hitachi (JP); Toshiaki Arato, Hitachinaka (JP); Shinzo Ikeda, Ibaraki-ken (JP); Ken Yasuda, Tokyo (JP); Hisao Yamashita, Hitachi (JP); Shigeru Azuhata, Hitachi (JP); Shin Tamata, Ibaraki-ken (JP); Kazuyoshi Irie, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 404 days.

(21) Appl. No.: 10/215,045

(22) Filed: Aug. 9, 2002

(65) Prior Publication Data

US 2004/0047784 A1 Mar. 11, 2004

Related U.S. Application Data

(62) Division of application No. 09/005,006, filed on Jan. 9, 1998.

(30) Foreign Application Priority Data

Jan. 14, 1997 (JP) ............................................. 09-004349
Jun. 20, 1997 (JP) ............................................. 09-163717

(51) Int. Cl.$^7$ ...................... B01D 53/48; B01D 53/68; B01D 53/86
(52) U.S. Cl. ................ 423/235; 423/239.1; 423/240 S; 423/244.01; 423/244.02; 423/244.1; 423/245.1; 423/245.3; 423/240 R
(58) Field of Search .................... 423/240 S, 242.2, 423/244.01, 244.02, 244.06, 244.09, 244.1, 235, 239.1, 245.1, 245.3, 240 R, 488, 483

(56) References Cited

U.S. PATENT DOCUMENTS

| 5,151,263 A | 9/1992 | Okawaki et al. |
| 5,276,249 A | 1/1994 | Greene et al. |
| 5,283,041 A | 2/1994 | Nguyen et al. |

(Continued)

FOREIGN PATENT DOCUMENTS

| DE | 43 11 061 | 4/1993 |
| EP | 412 456 | 8/1990 |
| EP | 412 456 | 2/1991 |

(Continued)

OTHER PUBLICATIONS

Explanation of Circumstances Concerning Accelerated Examination.
Japanese Office Action.
European Search Report.

*Primary Examiner*—Ngoc-Yen Nguyen
(74) *Attorney, Agent, or Firm*—Crowell & Moring LLP

(57) ABSTRACT

A gas stream containing at least one fluorine compound selected from the group consisting of compounds of carbon and fluorine, compounds of carbon, hydrogen and fluorine, compounds of sulfur and fluorine, compounds of nitrogen and fluorine and compounds of carbon, hydrogen, oxygen and fluorine is contacted with a catalyst comprising at least one of alumina, titania, zirconia and silica, preferably a catalyst comprising alumina and at least one of nickel oxide, zinc oxide and titania in the presence of steam, thereby hydrolyzing the fluorine compound at a relatively low temperature, e.g. 200°–800° C., to convert the fluorine of the fluorine compound to hydrogen fluoride.

23 Claims, 9 Drawing Sheets

U.S. PATENT DOCUMENTS

| | | | |
|---|---|---|---|
| 5,457,268 A | | 10/1995 | Greene et al. |
| 5,460,792 A | * | 10/1995 | Rosenbaum ............. 423/245.3 |
| 5,597,540 A | * | 1/1997 | Akita et al. ................. 423/241 |
| 5,622,682 A | * | 4/1997 | Tom ...................... 423/240 S |
| 5,649,985 A | * | 7/1997 | Imamura .................... 95/275 |
| 5,935,540 A | * | 8/1999 | Otsuka et al. .......... 423/239.1 |
| 6,069,291 A | * | 5/2000 | Rossin et al. ............... 588/206 |
| 6,673,326 B1 | * | 1/2004 | Rossin et al. ........... 423/240 S |

FOREIGN PATENT DOCUMENTS

| | | |
|---|---|---|
| EP | 0475442 | 3/1992 |
| EP | 485 787 | 5/1992 |
| EP | 597 393 | 5/1993 |
| EP | 642 809 | 8/1994 |
| JP | 62 273 039 | 11/1987 |
| JP | 3 047 516 | 2/1991 |
| JP | 4 122 419 | 4/1992 |
| JP | 6-59388 | 8/1994 |
| JP | 7-80303 | 3/1995 |
| JP | 7 080 303 | 3/1995 |
| JP | 7 116 466 | 5/1995 |
| JP | 8 000 963 | 1/1996 |
| WO | WO 97/49479 | 2/1997 |

* cited by examiner

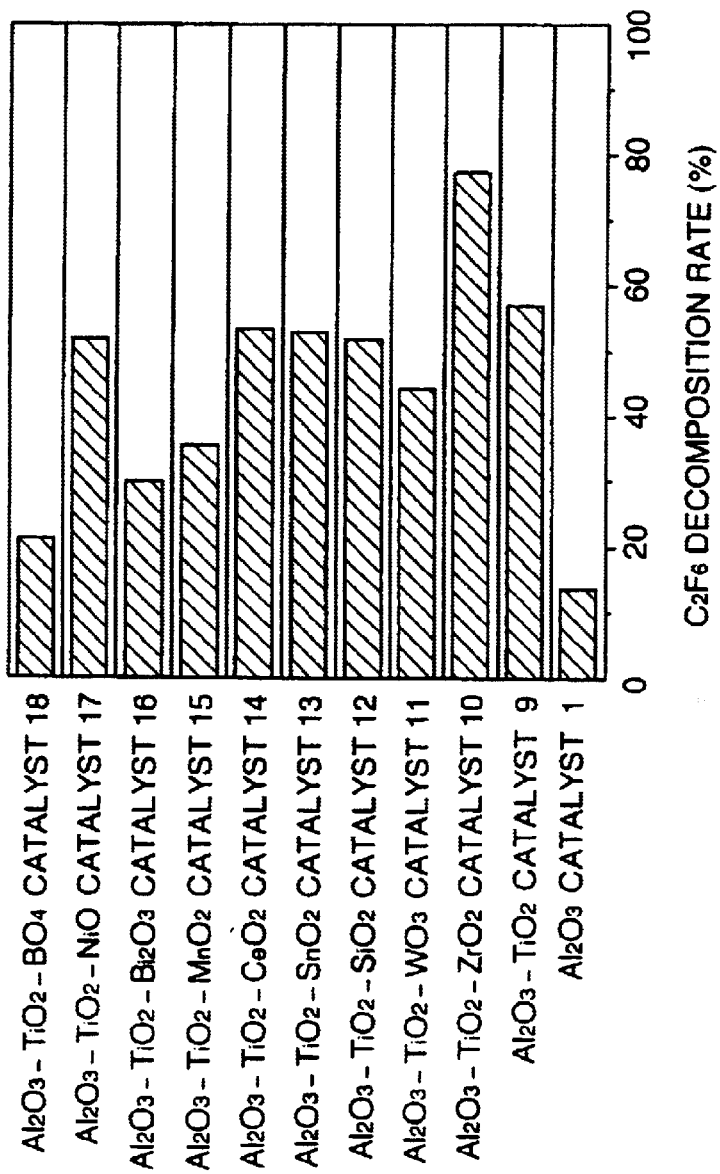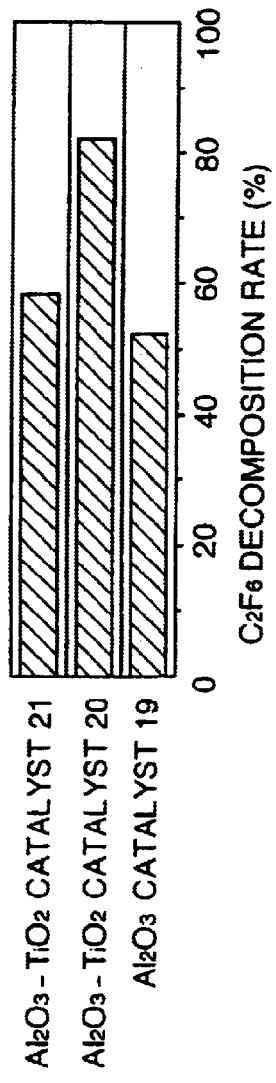

PROCESS FOR TREATING FLUORINE COMPOUND-CONTAINING GAS

This application is a division of application Ser. No. 09/005,006, filed Jan. 9, 1998.

BACKGROUND OF THE INVENTION

1) Field of the Invention

The present invention relates to a process for efficient decomposition treatment of a gas containing fluorine compounds such as $C_2F_6$, $CF_4$, $C_3F_8$, $C_4F_8$, $CHF_3$, $SF_6$, $NF_3$, etc. at a low temperature.

2) Related Art

Fluorine compound gases such as $CF_4$, $C_2F_6$, etc. are used in a large amount as a semiconductor etchant, a semiconductor cleaner, etc. However, it was found that these compounds, once discharged into the atmosphere, turn into warming substances causing global warming. Post-treatment of these compounds after their use would be subject to a strict control in the future.

Compounds having a high fluorine (F) content as a molecule constituent such as $CF_4$, $C_2F_6$, etc. have a higher electronegativity of fluorine and thus are chemically very stable. From this nature it is very hard to decompose such fluorine compounds, and it is thus in the current situations that no appropriate processes for such decomposition treatment are not available yet.

JP-B-6-59388 (U.S. Pat. No. 5,176,897) discloses a $TiO_2$—$WO_3$ catalyst for hydrolysis of organic halogen compounds. The catalyst contains 0.1 to 20% by weight of W on the basis of $TiO_2$ (i.e. 92% to 99.96% of Ti by atom and 8 to 0.04% by atom of W) and has a decomposition rate of 99% at 375° C. for a duration of 1,500 hours in treatment of $CCl_4$ in ppm order. JP-B-6-59388 suggests that organic halogen compounds having a single carbon atom, such as $CF_4$, $CCl_2F_2$, etc. can be decomposed, but shows no examples of decomposition results of fluorine compounds.

JP-A-7-80303 discloses another $Al_2O_3$—$ZrO_2$—$WO_3$ catalyst for decomposition of fluorine compound gases. The catalyst is directed to combustion-decomposition of CFCs (chlorofluorocarbons) and has a decomposition rate of 98% for a duration of 10 hours in treatment of CFC-115 ($C_2ClF_5$) by combustion-decomposition reaction at 600° C. The disclosed process needs addition of hydrocarbons such as n-butane, etc. as a combustion aid, resulting in a higher treatment cost. Among organic halogen compounds to be treated, fluorine compounds are less decomposable than chlorine compounds. Furthermore, the more the carbon atoms of organic halogen compound, the less decomposable. Decomposition of compounds consisting only of carbon and fluorine such as $C_2F_6$, etc. are much less decomposable than CFC-115, but no examples of decomposition results of such compounds are shown therein.

SUMMARY OF THE INVENTION

An object of the present invention is to provide a process for efficient decomposition treatment of compounds of carbon and fluorine, compounds of carbon, hydrogen and fluorine, compounds of sulfur and fluorine, compounds of nitrogen and fluorine and even compounds of carbon, hydrogen, fluorine and oxygen such as $C_2F_6$, $CF_4$, $C_3F_8$, $C_4F_8$, $CHF_3$, $SF_6$ and $NF_3$.

The present invention provides a process for treating a fluorine compound-containing gas, which comprises contacting a gas stream containing at least one fluorine compound selected from the group consisting of compounds of carbon and fluorine, compounds of carbon, hydrogen and fluorine, compounds of sulfur and fluorine, compounds of nitrogen and fluorine and compounds of carbon, hydrogen, oxygen and flourine with a catalyst containing at least one of alumina, titania, zirconia and silica in the presence of steam, thereby hydrolyzing the fluorine compound to convent fluorine of the fluorine compound to hydrogen fluoride.

BRIEF DESCRIPTION OF THE DRAWINGS

FIG. 3 is a graph showing performances of various catalysts for decomposing a fluorine compound.

FIG. 4 is a graph showing performances of various catalysts for decomposing a fluorine compound.

DESCRIPTION OF THE PREFERRED EMBODIMENTS

Figure 1:
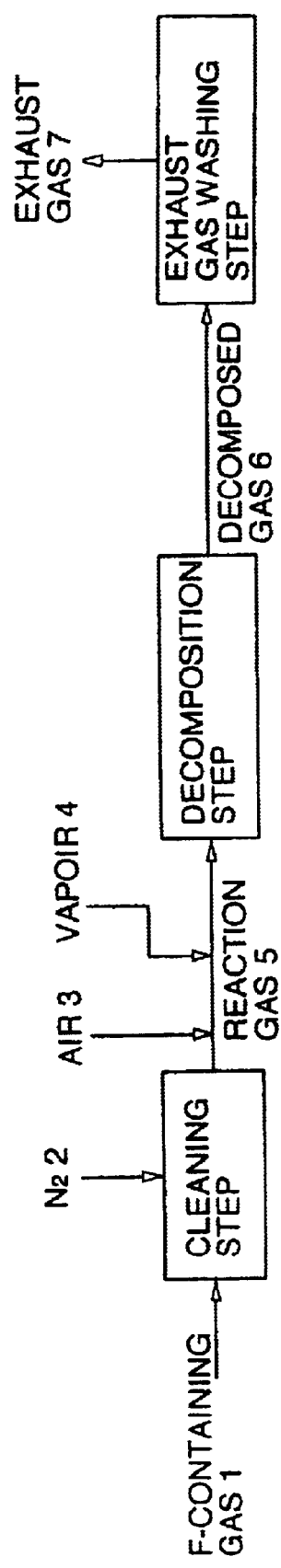
FIG. 1 is a block diagram showing a process for treating a fluorine compound-containing gas according to one embodiment of the present invention.

As a result of extensive studies on development of catalysts for decomposition of fluorine compound-containing gases, the present inventors have found that catalysts must contain a metallic component capable of forming an appropriately strong bond with fluorine as the nature of catalysts, and further have found that catalysts containing a metallic component having a higher fluoride formation enthalpy show a higher decomposition activity particularly in case of compounds consisting of carbon and fluorine, because molecules of such compounds are stable by themselves. Formation of too stable a bond will gradually lower the decomposition activity of catalysts, because fluorine compounds are less releasable from the catalyst surface, whereas too weak a bonding force will not attain a satisfactory decomposition rate. $C_2F_6$, one of gases to be treated according to the present invention, is a compound of poor reactivity because of a higher intramolecular force, and it is said that a temperature of 1,500° to 2,000° C. is required for combustion of such a gas.

As a result of tests on various catalysts, the present inventors have found that catalysts of alumina ($Al_2O_3$), titania ($TiO_2$), zirconia ($ZrO_2$), silica ($SiO_2$), a mixture of titania and zirconia, a mixture of alumina and magnesia (MgO), a mixture of alumina and titania, or a mixture of alumina and silica can hydrolyze fluorine compounds, and further have found that the fluorine compounds can be decomposed at a lower temperature than 800° C. thereby.

Among these catalysts, it has been found that a catalyst based on a mixture of alumina and titania has the highest activity and particularly a catalyst comprising 75 to 98% by weight of alumina and 25 to 2% by weight of titania has a particularly high activity. It can be presumed that the alumina of the catalyst based on a mixture of aluminia and titania acts to attract fluorine compounds onto the catalyst, whereas the titania acts to depart the fluorine compounds from the catalyst surface.

The present inventors further have found that catalysts based on the mixture of alumina and titania further containing at least one member selected from the group consisting of zirconia, tungsten oxide, silica, tin oxide, ceria, bismuth oxide, nickel oxide and boron oxide can hydrolyze fluorine compounds. It has been found that above all the catalyst containing zirconia has a higher decomposition activity on fluorine compounds. It has been further found that the content of at least one member selected from the group consisting of zirconia, tungsten oxide, silica, tin oxide, ceria, bismuth oxide, nickel oxide and boron oxide is preferably 0.1 to 10% by weight on the basis of sum total of alumina and titania and particularly the content of zirconia is preferably 2 to 10% by weight on the basis of sum total of alumina and titania. It seems that these additive members exist in the form of single oxides or composite oxides and contribute to an improvement of decomposition activity on fluorine compounds.

In catalyst preparation, it has been found that it is preferable to use boehmite for alumina raw material and a titanium sulfate solution for a titania raw material. It has been confirmed that there are sulfate ions, $SO_4^{2-}$, in the catalysts prepared from the titanium sulfate solution and the decomposition activity on fluorine compounds can be improved by the presence of sulfate ions. It has been found that addition of sulfuric acid is preferable during the catalyst preparation.

The present inventors further tested catalysts containing other components besides alumina and titania, specifically catalysts containing alumina and one of zinc oxide (ZnO), nickel oxide (NiO), iron oxide, tin oxide ($SnO_2$), platinum (Pt), cobalt oxide, zirconia ($ZrO_2$), ceria ($CeO_2$) and silica ($SiO_2$). As a result, it has been found that these catalysts can hydrolyze fluorine compounds and particularly catalysts containing zinc oxide or nickel oxide have a higher activity than catalysts based on the mixture of alumina and titania. It has been further found that catalysts comprising alumina and nickel oxide, admixed with sulfuric acid during the catalyst preparation have a higher activity than the catalyst without admixing with sulfuric acid. It has not been confirmed in which forms iron oxide or cobalt oxide of the catalysts containing the iron oxide or the cobalt oxide exists. Probably it seems to exist in the form of $Fe_2O_3$ or $Co_3O_4$.

It has been found that the catalysts comprising alumina and one of zinc oxide, nickel oxide, iron oxide, tin oxide, cobalt oxide, zirconia, ceria and silica as other components preferably contain 50 to 1% by atom of one metallic element of the other components, the balance being aluminum of the alumina, and the content of platinum is preferably 0.1 to 2% by weight on the basis (100% by weight) of alumina. It has been further found that these catalysts can further contain sulfur and the content of sulfur is preferably 0.1 to 20% by weight on the basis of the alumina catalyst.

Fluorine compounds to be treated according to the present invention include, for example, $CF_4$, $C_2F_6$, $C_3F_8$, $C_4F_8$, $C_5F_8$, $CHF_3$, $CH_2F_2$, $CH_3F$, $C_2HF_5$, $C_2H_2F_4$, $C_2H_3F_3$, $C_2H_4F_2$, $C_2H_5F$, $CH_2OCF_2$, $SF_6$, $NF_3$, etc., among which $CF_4$, $C_2F_6$, $C_3F_8$, $C_4F_8$, $CHF_3$, $SF_6$ and $NF_3$ are used as etchants for semiconductors and $CF_4$, $C_2F_6$ and $NF_3$ are used as cleaners for semiconductors.

According to the present invention, all of these fluorine compounds can be hydrolyzed. Hydrolysis temperature depends upon kinds of fluorine compounds and catalyst components, and is usually 200° to 800° C., preferably 400° to 800° C. According to the present process fluorine of fluorine compound gases can be converted to hydrogen fluoride.

Hydrolysis of fluorine compounds can proceed typically according to the following reaction equations:

$$CF_4 + 2H_2O \rightarrow CO_2 + 4HF \quad (1)$$

$$C_2F_6 + 3H_2O \rightarrow CO + CO_2 + 6HF \quad (2)$$

$$CHF_3 + H_2O \rightarrow CO + 3HF \quad (3)$$

$$SF_6 + 3H_2O \rightarrow SO_3 + 6HF \quad (4)$$

$$NF_3 + \tfrac{3}{2} H_2O \rightarrow NO + \tfrac{1}{2} O_2 + 3HF \quad (5)$$

Hydrolysis according to reaction equations (2) and (3) can produce CO. The present catalysts also have an ability to oxidize CO, and thus CO can be further oxidized to $CO_2$ in the presence of oxygen.

The present invention provides a process for hydrolyzing a fluorine compound-containing gas by a catalyst comprising at least one member selected from the group consisting of alumina, titania, zirconia, silica, a mixture of titania and zirconia, a mixture of alumina and magnesia, a mixture of alumina and titania and a mixture of alumina and silica.

Furthermore, the present invention provides a process for treating a fluorine-containing gas by a catalyst comprising alumina and titania, further containing 0.1 to 10% by weight, on the basis of alumina and titania, of one of zirconia, tungsten oxide, silica, tin oxide, ceria, bismuth oxide, nickel oxide and boron oxide.

Still furthermore, the present invention provides a process for treating a fluorine compound-containing gas by a catalyst comprising alumina and at least one member selected from the group consisting of zinc oxide, nickel oxide, iron oxide, tin oxide, cobalt oxide, zirconia, ceria, silica and platinum as other components, a ratio of aluminum of alumina to the metallic element of at least one of other components by atom is 50 to 99:50–1, and further by the catalyst further containing 0.1 to 20% by weight of sulfur on the basis of the alumina. These additive components can contribute to improvement of decomposition activity of the catalysts on fluorine compounds in the form of single oxides or composite oxides with aluminum and/or other additive components.

Still furthermore, the present invention provides a process for converting fluorine in a gas to hydrogen fluoride, which comprises contacting a gas stream containing a fluorine compound comprising $C_2F_6$ with a catalyst comprising a mixture of alumina and titania and having a weight ratio of alumina to titania being 65 to 90:35 to 10, thereby hydrolyzing the fluorine compounds. Still furthermore, the present invention provides a process for converting fluorine in a gas stream to hydrogen fluoride, which compound comprises contacting a gas stream comprising a fluorine compound comprising $C_2F_6$ with a catalyst comprising a mixture of alumina, titania and zirconia and having a weight ratio of alumina to titania being 65 to 90:35 to 10 and a weight ratio of zirconia to sum total of alumina and titania being 2 to 10:98 to 90, thereby hydrolyzing the fluorine compound.

Still furthermore, the present invention provides a process for converting fluorine in a gas stream to hydrogen fluoride, which comprises contacting a gas stream containing at least one fluorine compound selected from the group consisting of $C_2F_6$, $CF_4$, $C_4F_8$ and $CHF_3$ with a catalyst comprising a mixture of alumina and zinc oxide and having an atomic ratio of aluminum to zinc being 90 to 70:10 to 30, thereby hydrolyzing the fluorine compound.

Still furthermore, the present invention provides a process for converting fluorine in a gas stream to hydrogen fluoride, which comprises contacting a gas stream containing at least one fluorine compound selected from the group consisting of $C_2F_6$, $CF_4$, $C_3F_8$, $CHF_3$, $NF_3$ and $SF_6$ with a catalyst comprising a mixture of alumina and nickel oxide and having an atomic ratio of aluminum to nickel of 95 to 60:5 to 40, thereby hydrolyzing the fluorine compound.

Still furthermore, the present invention provides a process for converting fluorine in a gas stream to hydrogen fluoride, which comprises contacting a gas stream comprising a fluorine compound comprising $C_4F_8$ with a catalyst comprising a mixture of alumina, nickel oxide and zinc oxide, thereby hydrolyzing the fluorine compound.

Still furthermore, the present invention provides a process for converting fluorine in a gas stream to hydrogen fluoride, which comprises a hydrolysis step of contacting a gas discharged from a semiconductor-etching or cleaning step using a gas stream containing at least one fluorine compound selected from the group consisting of compounds of carbon and fluorine, compounds of carbon, hydrogen and fluorine, compounds of sulfur and fluorine, compounds of nitrogen and fluorine and compounds of carbon, hydrogen, oxygen and fluorine, after addition of air and steam to the gas, with a catalyst comprising at least one of alumina, titania, zirconia and silica, thereby hydrolyzing the fluorine compound to convert the fluorine in the gas to hydrogen fluoride, as a poststep to the semiconductor-etching or cleaning step.

Still furthermore, the present invention provide a process for treating a fluorine compound-containing gas, which further comprises an alkaline washing step of contacting the gas from the hydrolysis step with an alkaline washing solution, thereby washing the gas as a poststep to the hydrolysis step. As the alkaline washing solution, there can be used conventional ones such as a solution of NaOH, $Ca(OH)_2$, $Mg(OH)_2$, $CaCO_3$, etc., a slurry of $Ca(OH)_2$, etc.

In contacting of the gas stream containing a fluorine compound with the catalyst, the concentration of the fluorine compound in the gas stream is preferably 0.1 to 10% by volume, particularly preferably 0.1 to 3% by volume, and the space velocity is preferably 100 to 10,000 $h^{-1}$, particularly preferably 100 to 3,000 $h^{-1}$. Space velocity ($h^{-1}$) is defined by reaction gas flow rate (ml/h)/catalyst volume (ml).

In the hydrolysis of the fluorine compound, it is desirable to add steam as a hydrogen source for hydrolysis to the gas stream so as to make the amount of hydrogen atoms (H) at least equal to the amount of fluorine atoms (F) contained in the fluorine compound, thereby making the fluorine atoms (F) of decomposition products into the hydrogen fluoride (HF) form that allows easy post-treatment. Hydrogen, hydrocarbons, etc. can be used as a hydrogen source besides the steam. In case of hydrocarbons as a hydrogen source, hydrocarbons can be combusted on the catalyst, thereby effectively reducing the heat energy to be supplied.

By adding an oxidizing gas such as oxygen, etc. to the reaction gas, oxidation reaction of CO can be carried out at the same time. When the oxidation reaction of CO is incomplete, the decomposition product gas is brought into contact with the CO oxidizing catalyst, after removal of HF from the decomposition product gas, to convert CO to $CO_2$.

In the hydrolysis (decomposition) of fluorine compound, the reaction temperature is preferably about 200° to about 800° C. Above about 800° C., a higher decomposition rate can be obtained, but the catalyst will be rapidly deteriorated, and also the corrosion rate of apparatus structural materials will be abruptly increased, whereas below about 200° C. the decomposition rate will be lowered.

As the step of neutralizing and removing the formed HF, washing by spraying an alkaline solution is efficient and preferable because of less occurrence of clogging in pipings due to crystal deposition, etc. Bubbling of the decomposition product gas through the alkaline solution or washing with the alkaline solution through a packed column may be used for the neutralization and removal of the formed HF. Alternatively, HF can be absorbed in water, followed by treatment with an alkaline solution or slurry.

As the raw material for aluminum (Al) for preparing the present catalyst, γ-alumina and a mixture of γ-alumina and δ-alumina can be used besides boehmite. However, it is preferable to use boehmite as a raw material for Al to form an oxide through final firing.

As the raw material for titanium (Ti), titania sol, titanium slurry, etc. can be used besides titanium sulfate.

As the third metallic components for silica (Si), magnesium (Mg), zirconium (Zr), etc., their various nitrates, ammonium salts, chlorides, etc. can be used.

The present catalyst can be prepared by any of ordinary procedures for preparing catalysts, such as precipitation, impregnation, kneading, etc.

The present catalyst can be used as such or upon molding into a granular form, a honeycomb form, etc. by an desired molding procedure such as extrusion molding, tabletting, tumbling granulation, etc., or as a coating on ceramic or metallic honeycombs or plates.

Only a catalytic reactor for decomposing fluorine compounds and a facility for neutralizing and removing acid components in the decomposition product gas are required for an apparatus for carrying out the present process for treating fluorine compound-containing gas.

The present invention will be described in detail below, referring to Examples which are not limitative of the present invention.

FIG. 1 shows an example of using the present process for hydrolysis treatment of a fluorine gas in a cleaning step in a plasma CVD apparatus in the semi-conductor production process.

The plasma CVD apparatus is an apparatus for vapor depositing a $SiO_2$ film on a semiconductor wafer surface. Since the $SiO_2$ film tends to deposit on the entire interior surfaces of the apparatus, and thus it is necessary to remove $SiO_2$ depositions from unwanted surfaces. To clean the unwanted surface to remove $SiO_2$ therefrom, gases containing fluorine compounds such as $C_2F_6$, $CF_4$, $NF_3$, etc. are used as a cleaning gas. Cleaning gas 1 containing these fluorine compounds is led to a CVD chamber to remove $SiO_2$ under plasma excitation. Then, the chamber is flushed with a $N_2$ gas 2, thereby diluting the cleaning gas to a desired lower fluorine compound concentration, and the diluted cleaning gas is discharged from the chamber. The discharged gas is admixed with air 3 to further lower the fluorine compound concentration by dilution with air 3 and the air-diluted discharged gas is further admixed with steam 4 and the resulting reaction gas 5 is led to a decomposition step, where the reaction gas is brought into contact with a catalyst at a desired space velocity ($h^{-1}$), which is defined by reaction gas flow rate (ml/h)/catalyst volume (ml) and at a desired temperature. In that case, the reaction gas may be heated or the catalyst may be heated by an electric oven, etc. The resulting decomposition gas 6 is led to an exhaust gas washing step, where the decomposition gas 6 is sprayed with an aqueous alkaline solution to remove acid components from the decomposition gas 6 and the resulting exhaust gas 7 freed from the acid components is discharged to the system outside.

$CF_4$, $C_2F_6$ and $NF_3$ can be used as etchants for semiconductors, etc., and $CHF_3$, $C_3F_6$, $SF_6$ and $C_4F_8$ can be also used as etchants besides the above-mentioned fluorine compounds. These etchants can be treated and decomposed in the same manner as in FIG. 1 except that the cleaning step of FIG. 1 is only replaced with an etching step.

Activities or performances of various catalysts for composing fluorine compounds were investigated, and results thereof will be described below:

EXAMPLE 1

A $C_2F_6$ gas having a purity of 99% or more was diluted with air, and further admixed with steam to prepare a reaction gas. Steam for the admixture was prepared by feeding pure water into a reactor tube from the top at a flow rate of 0.11 ml/min. by a microtube pump and gasified. The reaction gas had a $C_2F_6$ concentration of about 0.5%. Then, the reaction gas was brought into contact with various catalysts heated to 700° C. in a reactor tube at a space velocity of 3,000 $h^{-1}$. Heating of the catalyst was carried out by heating the reactor tube in an electric oven.

Reactor tube was an Inconel reactor tube having an inner diameter of 19 mm, where a catalyst bed was fixed at the center of the reactor tube and had an Inconel thermowell for a thermo couple, 3 mm in outer diameter, inside the catalyst bed. Decomposition product gas discharged from the catalyst bed was bubbled through an aqueous sodium chloride solution an then discharged as an exhaust gas. $C_2F_6$ decomposition rate was calculated by the following equation by determining concentration of $C_2F_6$ in the reaction gas at the inlet to the reactor tube and concentration of $C_2F_6$ in the decomposition gas at the outlet from the alkaline washing step by FID (flame ionization detector) gas chromatography and TCD (thermal conductivity detector) gas chromatography:

$$\text{Decomposition rate} = 1 - \frac{\text{Concentration of discharged fluorine compound}}{\text{Concentration of fed fluorine compound}} \times 100 \ (\%)$$

Catalyst 1: $Al_2O_3$

Granular alumina (NKHD-24, trademark of a product commercially available from Sumitomo Chemical Co., Ltd., Japan) was pulverized, sieved to obtain a fraction of 0.5–1 mm grain sizes, followed by drying at 120° C. for 2 hours and firing (or calcining) at 700° C. for 2 hours.

Catalyst 2: $TiO_2$

Granular titania (CS-200-24, trademark of a product commercially available from Sakai Chemical Industry Co., Ltd., Japan) was pulverized, sieved to obtain a fraction of 0.5–1 mm grain sizes, followed by drying at 120° C. for 2 hours and firing at 700° C. for 2 hours.

Catalyst 3: $ZrO_2$ 200 g of zirconyl nitrate was dried at 120° C. for 2 hours and fired at 700° C. for 2 hours. The resulting powders were placed in a mold and compression molded under a pressure of 500 kgf/cm$^2$. The molded product was pulverized and sieved to obtain zirconia grains having grain sizes of 0.5–1 mm.

Catalyst 4: $SiO_2$

Granular silica (CARIACT-10, trademark of a product commercially available from Fuji Silysia Co., Ltd., Japan) was pulverized and sieved to obtain a fraction of 0.5–1 mm grain sizes, followed by drying at 120° C. for 2 hours and firing at 700° C. for 2 hours.

Catalyst 5: $TiO_2$—$ZrO_2$

Granular titania (CS-200-24) was pulverized to grain sizes of 0.5 mm and under. 100 g of the resulting powders was admixed with 78.3 g of zirconyl nitrate and kneaded while adding pure water thereto. After the kneading, the kneaded mixture was dried at 120° C. for 2 hours and fired at 700° C. for 2 hours. The resulting powders were placed in a mold and compression molded under a pressure of 500 kgf/cm$^2$. The molded product was pulverized and sieved to obtain grains having grain sizes of 0.5–1 mm. The resulting grain composition for catalyst was in an atomic ratio of Ti:Zr=81:19 and in a weight ratio of $TiO_2$:$ZrO_2$=73.5:26.5.

Catalyst 6: $Al_2O_3$—MgO

Granular alumina (NKHD-24) was pulverized to grain sizes of 0.5 mm and under. 100 g of the resulting powders were admixed with 56.4 g of magnesium nitrate and kneaded while adding pure water thereto. After the kneading, the kneaded mixture was dried at 120° C. for 2 hours and fired at 700° C. for 2 hours. The resulting powders were placed into a mold and compression molded under a pressure of 500 kgf/cm$^2$. The molded product was pulverized and sieved to obtain grains having grain sizes of 0.5–1 mm. The resulting grain composition for catalyst was in an atomic ratio of Al:Mg=90:10 and in a weight ratio of $Al_2O_3$:MgO=91.9:8.1.

Catalyst 7: $Al_2O_3$—$TiO_2$

Granular alumina (NKHD-24) was pulverized to grain sizes of 0.5 mm and under. 100 g of the resulting powders were admixed with 17.4 g of dried powders of a metatitanic acid slurry and kneaded while adding pure water thereto. After the kneading, the kneaded mixture was dried at 120° C. for 2 hours and fired at 700° C. for 2 hours. The resulting powders were placed in a mold and compression molded under a pressure of 500 kgf/cm$^2$. The molded product was pulverized and sieved to obtain grains having grain sizes of 0.5–1 mm. The resulting grain composition for catalyst was in an atomic ratio of Al:Ti=90:10 and in a weight ratio of $Al_2O_3$:$TiO_2$=85.2:14.8.

Catalyst 8: $Al_2O_3$—$SiO_2$

Granular alumina (NKHD-24) was pulverized to grain sizes of 0.5 mm and under. 100 g of the resulting powders were admixed with 13.2 g of dried powders of $SiO_2$ sol and kneaded while adding pure water thereto. After the kneading, the kneaded mixture was dried at 120° C. for 2 hours and fired at 700° C. for 2 hours. The resulting powders were placed in a mold and compression molded under a pressure of 500 mgf/cm$^2$. The molded product was pulverized and sieved to obtain grains having grain sizes of 0.5–1 mm. The resulting grain composition for catalyst was in an atomic ratio of Al:Si=90:10 and in a weight ratio of $Al_2O_3$:$SiO_2$=88.3:11.7.

Figure 2:
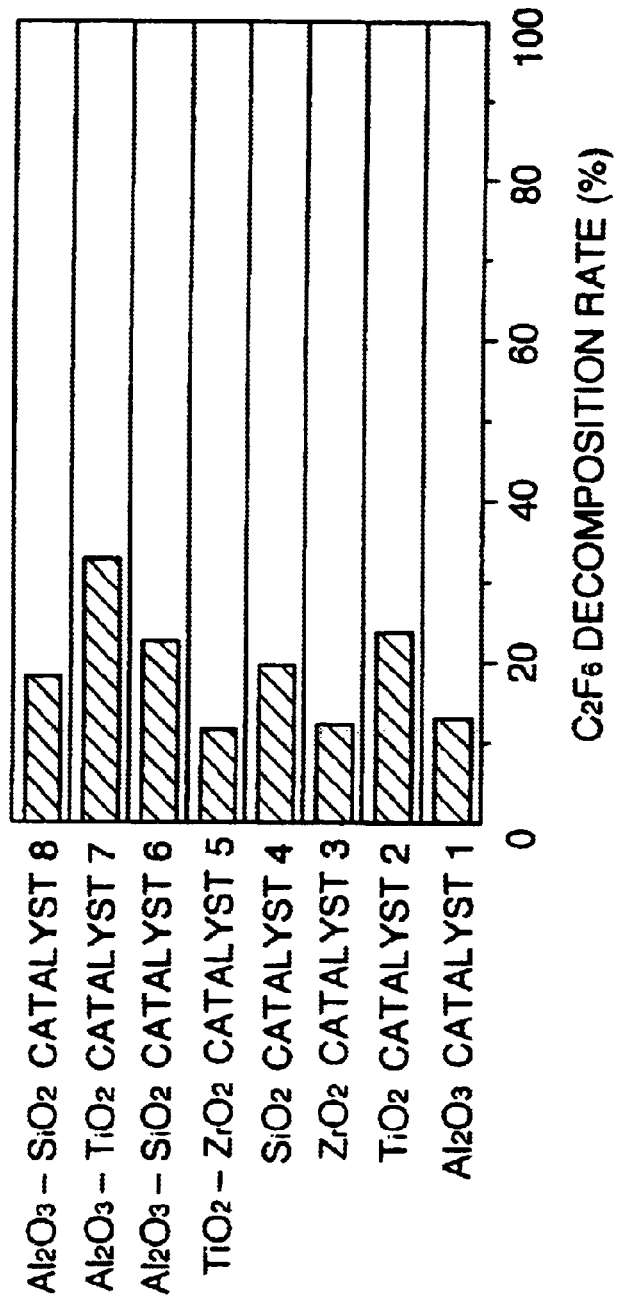
FIG. 2 is a graph showing performances of various catalysts for decomposing a fluorine compound.

Test results of the above-mentioned catalysts 1 to 8 are shown in FIG. 2, from which it is evident that the $Al_2O_3$—TiO catalyst is preferable as a hydrolysis catalyst for a $C_2F_6$ gas.

EXAMPLE 2

In this Example, influences of changes in composition ratios of alumina to titania in $Al_2O_3$—$TiO_2$ catalysts upon $C_2F_6$ decomposition rate were investigated under the same test procedure and conditions as in Example 1. The results are shown in FIG. 4.

Catalyst 19: $Al_2O_3$

Boehmite powders (PURAL SB, trademark of a product commercially available from Condea Co., Ltd.) were dried at 120° C. for 2 hours. 200 g of the resulting dried powders were fired at 300° C. for 0.5 hours and further fired at an elevated temperature of 700° C. for 2 hours. The resulting powders were placed into a mold and compression molded under a pressure of 500 kgf/cm$^2$. The molded product was pulverized and sieved to obtain grains having grain sizes of 0.5–1 mm, and tested. It was found that boehmite powders used as an alumina raw material had a higher catalytic activity than granular alumina.

Catalyst 20: $Al_2O_3$—$TiO_2$

Boehmite powders (PURAL SB) were dried at 120° C. for one hour. 200 g of the resulting dried powders were kneaded with 248.4 g of an aqueous 30% titanium sulfate solution, while adding about 200 g of pure water thereto. After the kneading, the kneaded mixture was dried at 250°–300° C. for about 5 hours and then fired at 700° C. for 2 hours. The resulting powders were placed into a mold and compression molded under a pressure of 500 kgf/cm$^2$. The molded product was pulverized and sieved to obtain grains having grain sizes of 0.5–1 mm and tested. The resulting grain composition for catalyst was in an atomic ratio of Al:Ti=90:10 and in a weight ratio of $Al_2O_3$:$TiO_2$=85.65:14.35.

Catalyst 21: $AlO_3$—$TiO_2$

Boehmite powders (PURAL SB) were dried at 120° C. for one hour. 200 g of the resulting dried powders were kneaded with about 100 g of an aqueous solution containing 78.6 g of 30% titania sol in pure water. After the kneading, the kneaded mixture was dried at 120° C. for about 2 hours and then fired at 700° C. for 2 hours. The resulting powders were placed into a mold and compression molded under a pressure of 500 kgf/cm$^2$. The molded product was pulverized and sieved to obtain grains having grain sizes of 0.5–1 mm and tested. The resulting grain composition for catalyst was in an atomic ratio of Al:Ti=91:9 and in a weight ratio of $Al_2O_3$:$TiO_2$=86.25:13.75.

It was found that the catalyst prepared from the titanium sulfate solution as a titanium raw material had the highest catalytic activity, probably because of the presence of sulfate ions $SO_4^{2-}$ in the catalyst.

EXAMPLE 3

In this Example, influences of changes in composition ratios of $Al_2O_3$ to $TiO_2$ in $Al_2O_3$—$TiO_2$ catalysts upon $C_2F_6$ decomposition rate were investigated under the same procedure and conditions as in Example 1.

Catalyst 22: $Al_2O_3$—$TiO_2$

Boehmite powders (PURAL SB) were dried at 120° C. for one hour. 100 g of the resulting dried powders were kneaded with 82.4 g of an aqueous 30% titanium sulfate solution while adding about 120 g of pure water thereto. After the kneading, the kneaded mixture was dried at 250°–300° C. for about 5 hours and then fired at 700° C. for 2 hours. The resulting powders were placed into a mold and compression molded under a pressure of 500 kgf/cm$^2$. The molded product was pulverized and sieved to obtain grains having grain sizes of 0.5–1 mm and tested. The resulting grain composition for catalyst was in an atomic ratio of Al:Ti=93:7 and in a weight ratio of $Al_2O_3$:$TiO_2$=90.0:10.0.

Catalyst 23: $Al_2O_3$—$TiO_2$

Boehmite powders (PURAL SB) were dried at 120° C. for one hour. 100 g of the resulting dried powders were kneaded with 174.4 g of an aqueous 30% titanium sulfate solution while adding about 70 g of pure water thereto. After the kneading, the kneaded mixture was dried at 250°–300° C. for about 5 hours and then fired at 700° C. for 2 hours. The resulting powders were placed into a mold and compression molded under a pressure of 500 kgf/cm$^2$. The molded product was pulverized and sieved to obtain grains having grain sizes of 0.5–1 mm and tested. The resulting grain composition for catalyst was in an atomic ratio of Al:Ti=87:13 and in a weight ratio of $Al_2O_3$:$TiO_2$=80.9:19.1.

Catalyst 24: $Al_2O_3$—$TiO_2$

Boehmite powders (PURAL SB) were dried at 120° C. for one hour. 100 g of the resulting dried powders were kneaded with 392 g of an aqueous 30% titanium sulfate solution while adding the latter to the former. After the kneading, the kneaded mixture was dried at 250°14 300° C. for about 5 hours and then fired at 700° C. for 2 hours. The resulting powders were placed into a mold and compression molded under a pressure of 500 kgf/cm$^2$. The molded product was pulverized and sieved to obtain grains having grain sizes of 0.5–1 mm and tested. The resulting grain composition for catalyst was in an atomic ratio of Al:Ti=75:25 and in a weight ratio of $Al_2O_3$:$TiO_2$=65.4:34.6.

Figure 5:
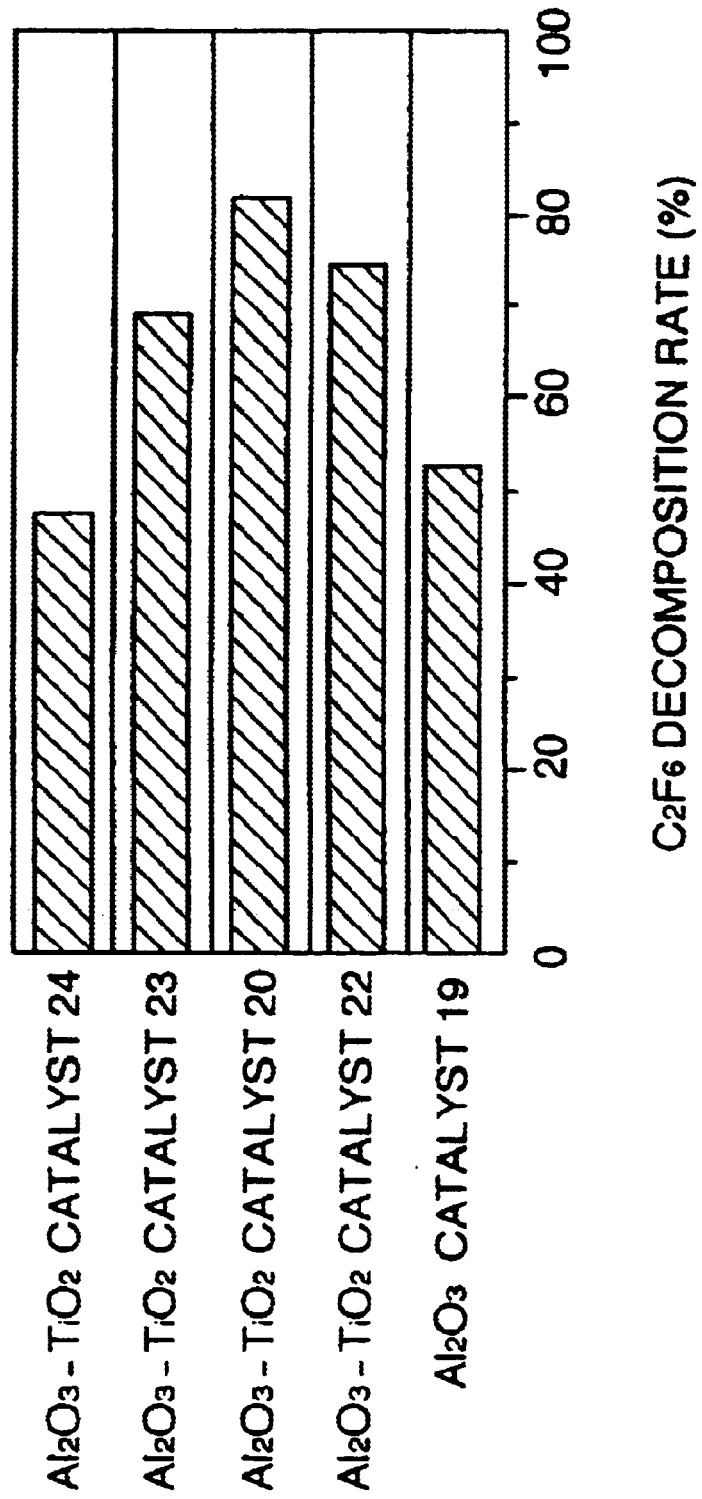
FIG. 5 is a graph showing performances of various catalysts for decomposing a fluorine compound.

Activities of catalysts 19, 20 and 22–24 are shown in FIG. 5, from which is evident that the highest $C_2F_6$ decomposition rate can be obtained at an alumina content of about 85% by weight.

EXAMPLE 4

In this Example, an influence of sulfuric acid during the preparation of the $Al_2O_3$—$TiO_2$ catalyst upon the $C_2F_6$ decomposition rate was investigated.

Catalyst 25: $Al_2O_3$—$TiO_2$

Boehmite powders (PURAL SB) was dried at 120° C. for one hour. 150 g of the resulting dried powders were kneaded with 58.5 g of 30% titania sol (CS-N, trademark of a product commercially available from Ishihara Sangyo Kaisha, Ltd., Japan) and an aqueous solution prepared by diluting 44.8 g of 97% sulfuric acid with 250 ml of pure water. After the kneading, the kneaded mixture was dried at 250°–300° C. for about 5 hours and then fired at 700° C. for 2 hours. The resulting powders were placed into a mold and compression molded under a pressure of 500 kgf/cm$^2$. The molded product was pulverized and sieved to obtain grains having grain sizes of 0.5–1 mm and tested. The resulting grain composition for catalyst was in an atomic ratio of Al:Ti=91:9 and in a weight ratio of $Al_2O_3$:$TiO_2$=86.3:13.7.

Sulfate ions were present in the catalyst. Test conditions were the same as in Example 1, except that the space velocity was changed to 1,000 h$^{-1}$. The test results revealed that a $C_2F_6$ decomposition rate of 80% was obtained at a reaction temperature of 650° C.

EXAMPLE 5

In this Example, $C_2F_6$ decomposition rates were investigated by adding various components to the $Al_2O_3$—$TiO_2$ catalysts. The catalysts were prepared as follows, but test procedure and conditions were the same as in Example 1.

Catalyst 9: $Al_2O_3$—$TiO_2$

Granular alumina (NKHD-24) was pulverized and sieved to obtain grains having grain sizes of 0.5–1 mm, followed by drying at 120° C. for 2 hours. Then, the dried grains were impregnated with 176 g of an aqueous 30% titanium sulfate solution. After the impregnation, the grains were dried at 250°–300° C. for about 5 hours and then fired at 700° C. for 2 hours. The resulting grain composition for catalyst was in an atomic ratio of Al:Ti=90:10 and in a weight ratio of $Al_2O:TiO_2$=85.1:14.9. The catalyst thus prepared was designated as catalyst A.

Catalyst 10: $Al_2O_3$—$TiO_2$—$ZrO_2$ 50 g of Catalyst A grains were impregnated with an aqueous solution of 6.7 g of zirconyl nitrate dihydrate in 38.4 g of $H_2O$. After the impregnation, the grains were dried at 120° C. for 2 hours and then fired at 700° C. for 2 hours. The resulting grain composition for catalyst was in an atomic ratio of Al:Ti:Zr=90:10:0.025 and in a weight ratio of $Al_2O_3$:$TiO_2$:$ZrO_2$=80.2:14.0:5.8.

Catalyst 11: $Al_2O_3$—$TiO_2$—$WO_3$ 50 g of Catalyst A grains were impregnated with 38.4 g of an aqueous solution of 6.5 g of ammonium paratungstate in $H_2O$. After the impregnation, the grains were dried at 120° C. for 2 hours and then fired at 700° C. for 2 hours. The resulting grain composition for catalyst was in an atomic ratio of Al:Ti:W=90:10:0.025 and in a weight ratio of $Al_2O_3$:$Ti_2$:$WO_3$=76.6:13.4:10.0.

Catalyst 12: $Al_2O_3$—$TiO_2$—$SiO_2$ 50 g of Catalyst A grains were impregnated with 38.4 g of an aqueous solution of 7.5 g of 20 wt. % silica sol in $H_2O$. After the impregnation, the grains were dried at 120° C. for 2 hours and then fired at 700° C. for 2 hours. The resulting grain composition for catalyst was in an atomic ratio of 90:10:0.025 and in a weight ratio of $Al_2O_3$:$TiO_2$:$SiO_2$= 82.6:14.5:2.9.

Catalyst 13: $Al_2O_2$—$TiO_2$—$SnO_2$ 50 g of Catalyst A grains were impregnated with 38.4 g of an aqueous solution of 5.6 g of tin chloride dihydrate in $H_2O$. After the impregnation, the grains were dried at 120° C. for 2 hours and then fired at 700° C. for 2 hours. The resulting grain composition for catalyst was in an atomic ratio of Al:Ti:Sn=90:10:0.025 and in a weight ratio of $Al_2O_3$:$TiO_2$:$SnO_2$=79.1:13.9:7.0.

Catalyst 14: $Al_2O_3$—$TiO_2$—$CeO_2$ 50 g of Catalyst A grains were impregnated with 38.4 g of an aqueous solution of 10.9 g of cerium nitrate hexahydrate in $H_2O$. After the impregnation, the grains were dried at 120° C. for 2 hours and then fired at 700° C. for 2 hours. The resulting grain composition for catalyst was in an atomic ratio of Al:Ti:Ce=90:10:0.025 and in a weight ratio of $Al_2O_3$:$TiO_2$:$CeO_2$=78.4:13.7:7.9.

Catalyst 15: $Al_2O_3$—$TiO_2$—$MnO_2$ 50 g of Catalyst A grains were impregnated with 38.4 g of an aqueous solution of 7.2 g of manganese nitrate hexahydrate in $H_2O$. After the impregnation, the grains were dried at 120° C. for 2 hours and then fired at 700° C. for 2 hours. The resulting grain composition for catalyst was in an atomic ratio of Al:Ti:Mn=90:10:0.025 and in a weight ratio of $Al_2O_3$:$TiO_2$:$MnO_2$=81.6:14.3:4.1.

Catalyst 16: $Al_2O_3$—$TiO_2$—$Bi_2O_3$ 50 g of Catalyst A grains were impregnated with 38.4 g of an aqueous solution of 12.13 g of bithmus nitrate hexahydrate in $H_2O$. After the impregnation, the grains were dried at 120° C. for 2 hours and then fired at 700° C. for 2 hours. The resulting grain composition for catalyst was in an atomic ratio of Al:Ti:Bi=90:10:0.025 and in a weight ratio of $Al_2O_3$:$TiO_2$:$Bi_2O_3$=85.1:14.8:1.1.

Catalyst 17: $Al_2O_3$—$TiO_2$—NiO 50 g of Catalyst A grains were impregnated with 38.4 g of an aqueous solution of 7.3 g of nickel nitrate hexahydrate in $H_2O$. After the impregnation, the grains were dried at 120° C. for 2 hours and then fired at 700° C. for 2 hours. The resulting grain composition for catalyst was in an atomic ratio of Al:Ti:Ni=90:10:0.025 and in a weight ratio of $Al_2O_3$:$TiO_2$:NiO=82.0:14.4:3.6.

Catalyst 18: $Al_2O_3$—$TiO_2$—$BO_4$ 50 g of Catalyst A grains were impregnated with 38.4 g of an aqueous solution of 1.36 g of ammonium borate octahydrate in $H_2O$. After the impregnation, the grains were dried at 120° C. for 2 hours and then fired at 700° C. for 2 hours. The resulting grain composition for catalyst was in an atomic ratio of Al:Ti:B=90:10:0.005 and in a weight ratio of $Al_2O_3$:$TiO_2$:$BO_4$=85.65:14.827:0.008.

It was found from FIG. 3 that the $Al_2O_3$—$TiO_2$—$ZrO_2$ catalyst had the highest activity.

EXAMPLE 6

In this Example, various catalysts containing alumina as one member were investigated for $C_2F_6$ decomposition rates under the following conditions:

A $C_2F_6$ gas having a purity of 99% or more was diluted with air, and the diluted gas was further admixed with steam to prepare a reaction gas. Steam was prepared by feeding pure water to a reactor tube from the top at a flow rate of about 0.2 ml/min. by a microtube pump to gasify the pure water. The reaction gas had a $C_2F_6$ concentration of about 0.5%, and was brought into contact with a catalyst heated to 700° C. by external heating of the reactor tube in an electric oven at a space velocity of 2,000 $h^{-1}$.

The reactor tube was an Inconel reactor tube having an inner diameter of 32 mm and had a catalyst bed fixed at the center of the reactor tube. An Inconel thermowell for a thermocouple, 3 mm in diameter, was inserted into the catalyst bed. Decomposition product gas from the catalyst bed was bubbled through an aqueous calcium fluoride solution and discharged to the system outside.

The following catalysts were prepared for the test under the foregoing conditions:

Catalyst 26

Boehmite powders (PURAL SB) were dried at 120° C. for one hour. 200 g of the resulting dried powders zinc nitrate hexahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in an atomic ratio of Al:Zn=91:9 and in a weight ratio of $Al_2O_3$:ZnO=86.4:13.6.

Catalyst 27

Boehmite powders (PURAL SB) were dried at 120° C. for one hour. 200 g of the resulting dried powders were admixed with an aqueous solution of 50.99 g of nickel sulfate hexahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=91:9 and in a weight ratio of $Al_2O_3$:NiO=87.3:12.7.

Catalyst 28

Boehmite powder (PURAL SB) were dried at 120° C. for one hour. 300 g of the resulting dried powders were admixed with an aqueous solution of 125.04 g of nickel nitrate hexahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=91:9 and in a weight ratio of $Al_2O_3$:NiO=87.3:12.7.

Catalyst 29

Boehmite powders (PURAL SB) were dried at 120° C. for one hour. 300 g of the resulting dried powders were kneaded with 354.4 g of an aqueous 30% titanium sulfate solution while adding about 300 g of pure water thereto. After the kneading, the kneaded mixture was dried at 250°–300° C. for about 5 hours and then fired at 700° C. for 2 hours. The fired product was pulverized and sieved to obtain grains having grain sizes of 0.5–1 mm and tested. The resulting grain composition for catalyst was in an atomic ratio of Al:Ti=91:9 and in a weight ratio of $Al_2O_3$:$TiO_2$=86.6:13.4.

Catalyst 30

Boehmite powders (PURAL SB) were dried at 120° C. for one hour. 200 g of the resulting dried powders were admixed with an aqueous solution of 115.95 g of iron nitrate nonahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm, and tested. The resulting grain composition was in an atomic ratio of Al:Fe=91:9.

Catalyst 31

Boehmite powder (PURAL SB) were dried at 120° C. for one hour. 200 g of the resulting dried powders were admixed with an aqueous solution of 95.43 g of tin chloride hydrate and the mixture was kneaded. After the kneading, the kneaded mixture was dried at 250°–300° C. for about 2 hours and then dried at 700° C. for 2 hours. The fired product was pulverized and sieved to obtain grains having grain sizes of 0.5–1 mm and tested. The resulting grain composition for catalyst was in an atomic ratio of Al:Sn=91:9 and in a weight ratio of $Al_2O_3$:$SnO_2$=77.4:22.6.

Catalyst 32

Boehmite powders (PURAL SB) were dried at 120° C. for one hour. 200 g of the resulting dried powders were admixed with an aqueous solution prepared by diluting 22.2 g of a dinitrodiamino Pt(II) nitric acid solution (Pt concentration: 4.5 wt. %) with 200 ml of pure water, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in a weight ratio of $Al_2O_3$:Pt=100:0.68.

Catalyst 33

Boehmite powders (PURAL SB) were dried at 120° C. for one hour. 300 g of the resulting dried powders were admixed with an aqueous solution of 125.87 g of cobalt nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition was in an atomic ratio of Al:Co=91:9.

Catalyst 34

Boehmite powder (PURAL SB) were dried at 120° C. for one hour. 200 g of the resulting dried powders were admixed with an aqueous solution of 76.70 g of zirconyl nitrate dihydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in an atomic ratio of Al:Zr=91:9 and in a weight ratio of $Al_2O_3$:$ZrO_2$=80.7:19.3.

Catalyst 35

Boehmite powders (PURAL SB) were dried at 120° C. for one hour. 200 g of the resulting dried powders were admixed with an aqueous solution of 124.62 g of cerium nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in an atomic ratio of Al:Ce=91:9 and in a weight ratio of $Al_2O_3$:$CeO_2$=75.0:25.0.

Catalyst 36

Boehmite powders (PURAL SB) were dried at 120° C. for one hour. 300 g of the resulting dried powders were admixed with an aqueous solution of 129.19 g of 20 wt. % silica sol, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm and tested. The resulting grain composition for catalyst was in an atomic ratio of Al:Si=91:9 and in a weight ratio of $Al_2O_3$:$SiO_2$=89.6:10.4.

Figure 6:
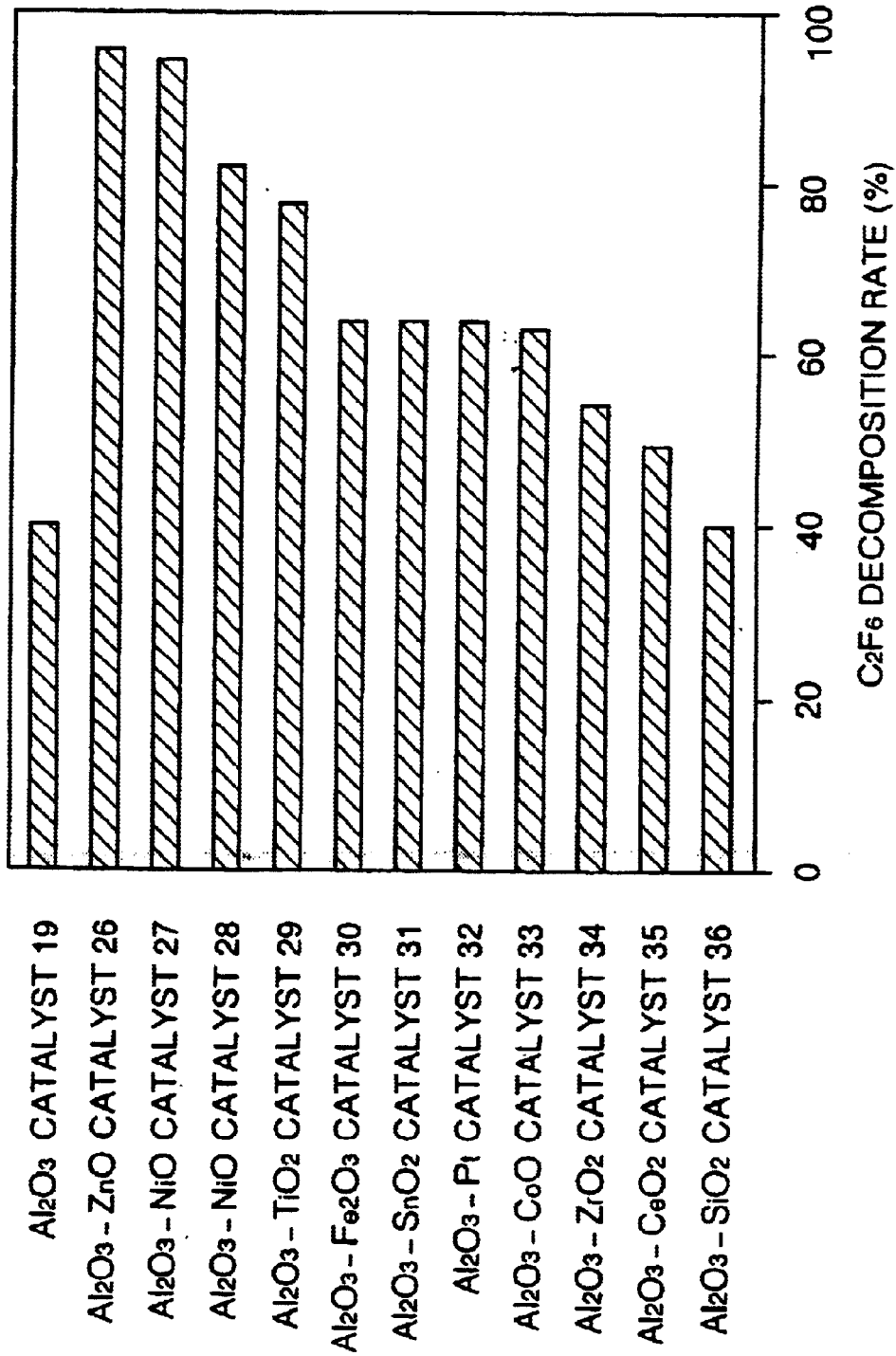
FIG. 6 is a graph showing performances of various catalysts for decomposing a fluorine gas.

Test results of the foregoing catalysts 19 and 26–36 at a reaction temperature of 700° C. are shown in FIG. 6, $C_2F_6$ decomposition activity is highest with the $Al_2O_3$—$ZnO_2$ catalyst and is lowered in the order of the $Al_2O_3$—NiO catalyst, and the $Al_2O_3$—$TiO_2$ catalyst. The highest activity of catalyst 26 seems to be due to the effect of S.

EXAMPLE 7

In this Example, changes in the activity of $Al_2O_3$—NiO catalyst 28 were investigated by changing atomic ratios of Al:Ni. Test procedure and conditions were the same as in Example 6 except that the $C_2F_6$ concentration was changed to 2% and the feed rate of pure water to 0.4 ml/min.

Catalyst 28-1

Boehmite powders (PURAL SB) were dried at 120° C. for one hour. 200 g of the resulting dried powder were admixed with an aqueous solution of 8.52 g of nickel nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=99:1 and in a weight ratio of $Al_2O_3$:NiO=98.5:1.5.

Catalyst 28-2

Boehmite powders (PURAL SB) were dried at 120° C. for one hour. 300 g of the resulting powders were admixed with an aqueous solution of 66.59 g of nickel nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=95:5 and in a weight ratio of $Al_2O_3$:NiO=92.8:7.2.

Catalyst 28-3

Boehmite powders (PURAL SB) were dried at 120° C. for one hour. 200 g of the resulting dried powders were admixed with an aqueous solution of 210.82 g of nickel nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=80:20 and in a weight ratio of $Al_2O_3$:NiO=73.2:26.8.

Catalyst 28-4

Boehmite powders (PURAL SB) were dried at 120° C. for one hour. 200 g of the resulting dried powders were admixed with an aqueous solution of 361.16 g of nickel nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=70:30 and in a weight ratio of $Al_2O_3$:NiO=61.4:38.6.

Catalyst 28-5

Boehmite powders (PURAL SB) were dried at 120° C. for one hour. 200 g of the resulting dried powders were admixed with 562.1 g of nickel nitrate hexahydrate, and the mixture was kneaded while adding water thereto. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Ni=60:40 and in a weight ratio of $Al_2O_3$:NiO=50.6:49.4.

Figure 7:
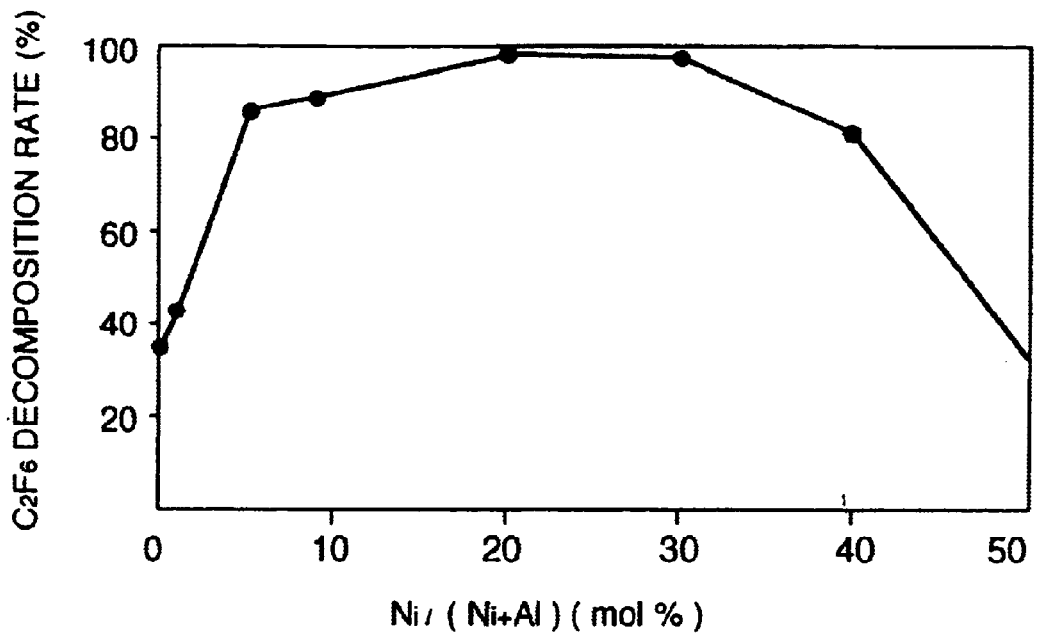
FIG. 7 is a graph showing performance of catalysts with various composition ratios for decomposing a fluorine gas.

$C_2F_6$ decomposition rate 6 hours after the start of test is shown in FIG. 7. It was found that the Ni content of $Al_2O_3$—NiO catalysts is in a range of 5 to 40 atom %, preferably 20 to 30 atom %.

EXAMPLE 8

In this Example, changes in the activity of $Al_2O_3$—ZnO catalyst 26 was investigated by changing atomic ratios of Al:Zn. Test procedure and conditions were the same as in Example 6 except that the $C_2F_6$ concentration was changed to 2% and the feed rate of pure water to 0.4 ml/min.

Catalyst 26-1

Boehmite powders (PURAL SB) were dried at 120° C. for one hour. 200 g of the resulting dried powders were admixed with an aqueous solution of 215.68 g of zinc nitrate hexahydrate and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Zn=80:20 and in a weight ratio of $Al_2O_3$:ZnO=71.5:28.5.

Catalyst 26-2

Boehmite powders (PURAL SB) were dried at 120° C. for one hour. 200 g of the resulting dried powders were admixed with 369.48 g of zinc nitrate hexahydrate and the mixture was kneaded. After the kneading, the kneaded mixture was dried at 250°–300° C. for about 2 hours and fired at 700° C. for 2 hours. The fired product was pulverized and sieved to obtain grains having grain sizes of 0.5–1 mm. The resulting grain composition for catalyst was in an atomic ratio of Al:Zn=70:30 and in a weight ratio of $Al_2O_3$:ZnO=59.4:40.6.

Catalyst 26-3

Boehmite powders (PURAL SB) were dried at 120° C. for one hour. 126.65 g of the resulting dried powders were admixed with an aqueous solution of 96.39 g of zinc nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Zn=85:15 and in a weight ratio of $Al_2O_3$:ZnO=78.0:22.0.

Figure 8:
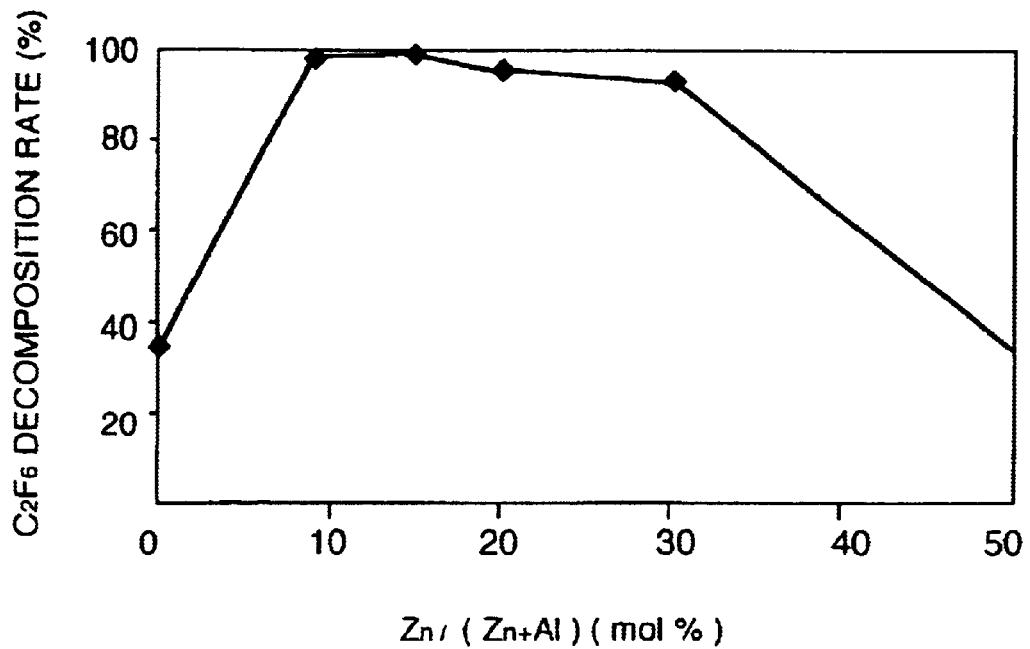
FIG. 8 is a graph showing performance of catalysts with various composition ratios for decomposing a fluorine gas.

$C_2F_6$ decomposition rate 6 hours after the start of test is shown in FIG. 8. It was found that the Zn content of $Al_2O_3$—$ZnO_2$ catalysts is in a range of 10 to 30 atom %, preferably 10 to 15 atom %.

EXAMPLE 9

Figure 9:
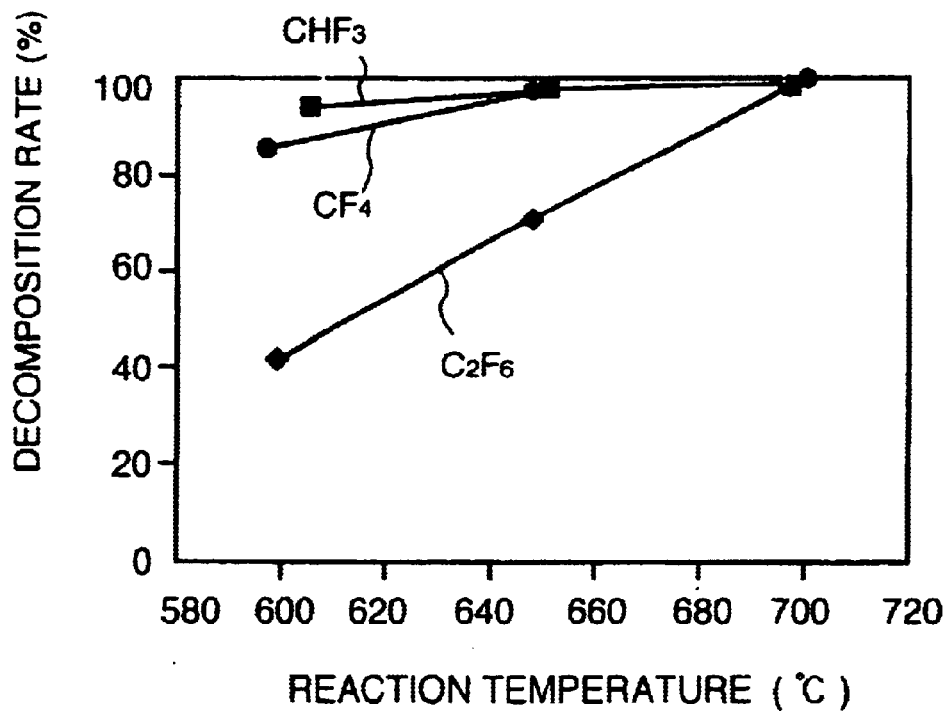
FIG. 9 is a graph showing relations between reaction temperature and decomposition rate of various fluorine compounds.

In this Example, decomposition of $CF_4$ and $CHF_3$ was carried out with a $Al_2O_3$—NiO catalyst 28-3 under the same test procedure and conditions as in Example 6, except that the space velocity was changed to 1,000 $h^{-1}$ and the fluorine compound was diluted with nitrogen in place of air. Test results at various reaction temperatures are shown in FIG. 9. It was found that the decomposition activity of $Al_2O_3$—NiO catalyst upon $CF_4$ gas and $CHF_3$ gas is higher than upon $C_2F_6$ gas and the $Al_2O_3$—NiO catalyst is a preferable hydrolysis catalyst for $CF_4$ or $CHF_3$. Furthermore, it was found that a preferable reaction temperature is 600°–700° C. for the decomposition of $CF_4$ and $CHF_3$, and 650°–700° C. for the decomposition of $C_2F_6$. The higher the reaction temperature, the higher the decomposition rate. However, substantially 100% decomposition rate can be obtained at 700° C., and thus a higher reaction temperature than 700° C. will be meaningless, and a reaction temperature must be as high as 800° C.

EXAMPLE 10

Figure 10:
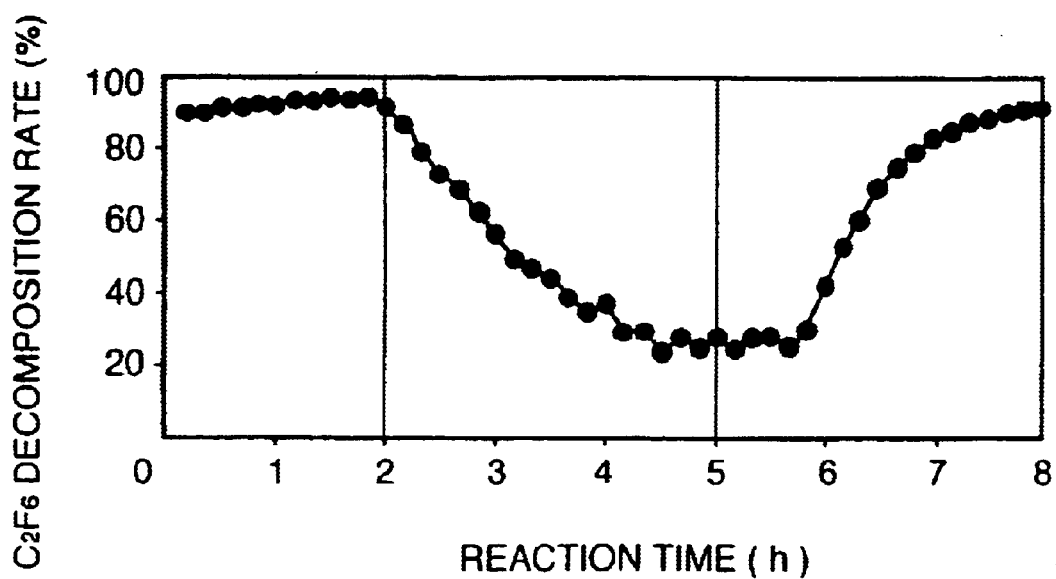
FIG. 10 is a graph showing relations between reaction time and decomposition rate of a fluorine compound.

In this Example, influences of steam upon $C_2F_6$ decomposition were investigated under the same test conditions as in Example 6 except that the space velocity was changed 1,000 $h^{-1}$. $Al_2O_3$—NiO catalyst 28-3 was used at a reaction temperature of 700° C. while supplying steam for 2 hours from the start of test, then interrupting supply of steam for 3 hours, and then starting to supply steam again. Test results are shown in FIG. 10. It was found that during the supply of steam the $C_2F_6$ reaction rate was elevated due to the occurrence of $C_2F_6$ hydrolysis.

EXAMPLE 11

In this Example, decomposition of $SF_6$ was investigated with $Al_2O_3$—NiO catalyst 28-3 under the same test conditions as in Example 6 except that a $SF_6$ gas having a purity of 99% or more was used, the space velocity was changed to 1,000 $h^{-1}$ and the $SF_6$ gas was diluted with nitrogen in of air. The reaction temperature was 700° C. Concentration of $SF_6$ in the reaction gas at the inlet to the reactor tube and concentration of $SF_6$ in the decomposition gas at the outlet from the alkaline washing step were determined by TCD gas chromatography and the decomposition rate was calculated by the following equation. It was found that the decomposition rate was 99% or more.

$$\text{Decomposition rate} = \left(1 - \frac{\text{Concentration of discharged } SF_6}{\text{Concentration of fed } SF_6}\right) \times 100 \, (\%)$$

EXAMPLE 12

In this Example, decomposition of $NF_3$ was investigated with $Al_2O$—NiO catalyst 28-3 under the same test conditions as in Example 11 except that a $NF_3$ gas having a purity of 99% or more was used. Reaction temperature was 700° C. Concentration of $NF_3$ in the reaction gas at the inlet to the reactor tube and concentration of $NF_3$ in the decomposition gas at the outlet from the alkaline washing step were determined by TCD gas chromatography and the decomposition rate was calculated according to the following equation. It was found that the decomposition rate was 99% or more. It was found preferable to carry out the decomposition of the $NF_3$ gas with the $Al_2O_3$—NiO catalyst at a temperature of 600°–800° C.

$$\text{Decomposition rate} = \frac{\text{Concentration of discharged } NF_3}{\text{Concentration of fed } NF_3} \times 100 \ (\%)$$

EXAMPLE 13

In this Example, activity of $Al_2O_3$—ZnO catalyst upon hydrolysis of a $CF_4$ gas, a $C_4F_8$ gas and a $CHF_3$ gas was investigated. Decomposition of a $CF_4$ gas was carried out in the following manner:

At first, a $CF_4$ gas having a purity of 99% or more was diluted with air, and the diluted $CF_4$ gas was further admixed with steam. Concentration of $CF_4$ in the reaction gas was about 0.5%, and steam flow rate was adjusted to about 50 times as high as that of the fluorine compound, i.e. $CF_4$. The reaction gas was brought into contact with the catalyst heated to a predetermined temperature in a reactor tube in an electric oven at a space velocity of 1,000 $h^{-1}$. Decomposition product gas from the catalyst bed was bubbled through an aqueous sodium hydroxide solution and then discharged to the system outside. Decomposition rate of $CF_4$ was determined by TCD gas chromatography.

The $Al_2O_3$—ZnO catalyst used for the test was prepared in the following manner:

Boehmite powders (PURAL SB) were dried at 120° C. for one hour. 126.65 g of the resulting dried powders were admixed with 96.39 g of zinc nitrate hexahydrate, and the mixture was kneaded. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in an atomic ratio of Al:Zn=85:15 and in a weight ratio of $Al_2O_3$:ZnO=78:22.

Figure 11:
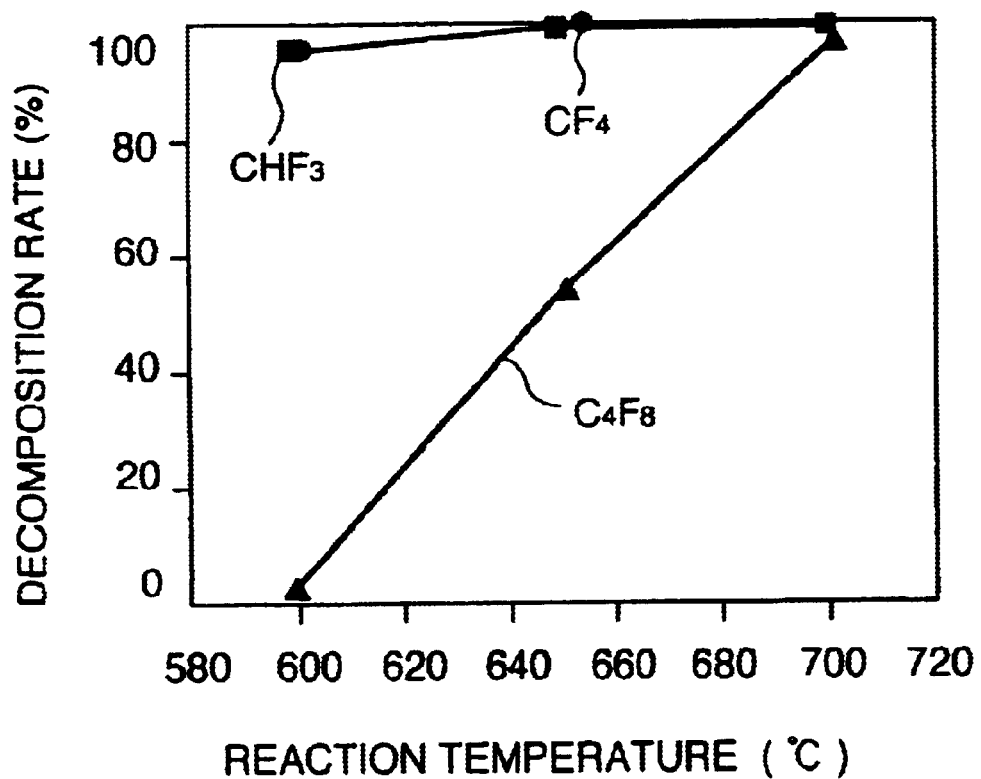
FIG. 11 is a graph showing relations between reaction temperature and decomposition rate of $CHF_3$, $CF_4$ and $C_4H_8$ by an $Al_2O_3$—ZnO catalyst.

FIG. 11 shows decomposition rates of $CF_4$ at various reaction temperatures and also those of $CHF_3$ and $C_4F_8$ as fed and decomposed in the same manner as above. Decomposition rates of $CHF_3$ and $C_4F_8$ were determined by FID gas chromatography, whereby it was found that the $Al_2O_3$—ZnO catalyst had a higher activity upon the $CF_4$ gas, the $C_4F_8$ gas and the $CHF_3$ gas. It was also found that a higher decomposition rate can be obtained preferably at a reaction temperature of 650° C. or higher for the hydrolysis of the $C_4F_8$ gas and even at a reactor temperature of 600° C. or lower for the hydrolysis of the $CHF_3$ gas or the $CF_4$ gas.

EXAMPLE 14

In this Example, the decomposition activity of as $Al_2O_3$—NiO catalyst upon a $C_3F_8$ gas, a $C_4F_8$ gas and a $SF_6$ gas was investigated in the same manner as in Example 13. The concentration of $C_4F_8$ in the reaction gas after decomposition of $C_4F_8$ was 0.1% by volume. The $Al_2O_3$—NiO catalyst used for the test was prepared in the following manner:

Boehmite powders (PURAL SB) were dried at 120° C. for one hour. 200 g of the resulting dried powders were admixed with an aqueous solution of 210.82 g of nickel nitrate hexahydrate, and the mixture was kneaded. After the kneading, the kneaded mixture was dried at 250°–300° C. for about 2 hours, and then fired at 700° C. for 2 hours. The fired product was pulverized and sieved to obtain grains having grain sizes of 0.5–1 mm. The resulting grain composition for catalyst was in an atomic ratio of Al:Ni=80:20 and in a weight ratio of $Al_2O_3$:NiO=73.2:26.8.

Figure 12:
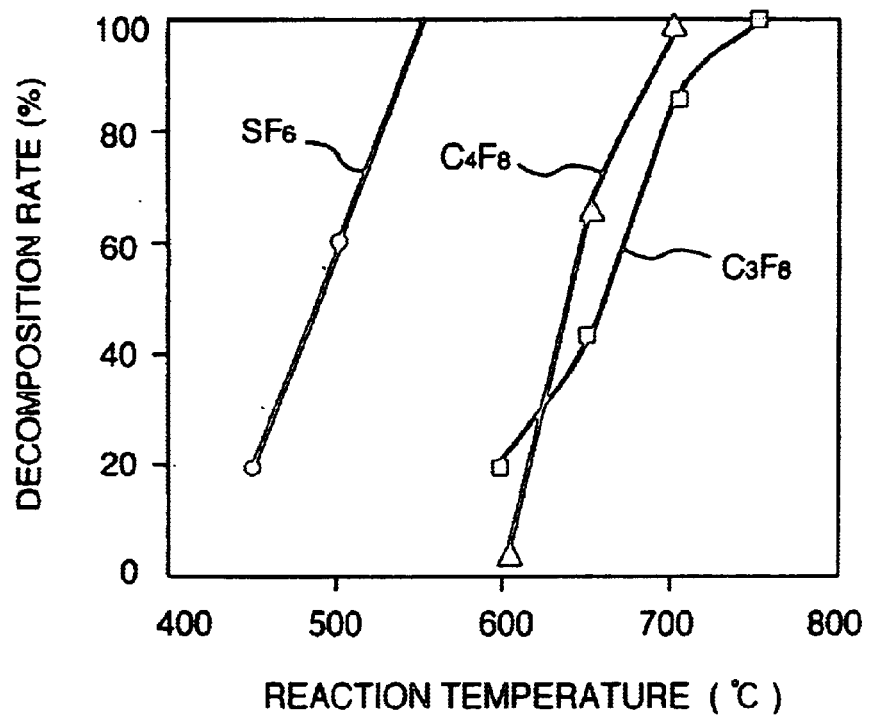
FIG. 12 is a graph showing relations between reaction temperature and decomposition rate of $SF_6$ and $C_3F_8$ by an $Al_2O_3$—NiO catalyst.

FIG. 12 shows decomposition rates at various reaction temperatures, where the decomposition rate of $C_3F_8$ and $C_4F_8$ was determined by FID gas chromatography and that of $SF_6$ by TCD gas chromatography. It was found from the test results that the $Al_2O_3$—NiO catalyst had a higher activity upon the hydrolysis of the $SF_6$ gas, $C_3F_8$ gas and the $C_4F_8$ gas, and the reaction temperature was preferably 500° C. or higher for the hydrolysis of the $SF_6$ gas and preferably 700° C. or higher for the hydrolysis of the $C_3F_8$ gas. In the case of $C_4F_8$ gas, the reaction temperature for the hydrolysis was preferably 650° C. or higher.

EXAMPLE 15

In this Example, decomposition activity of an $Al_2O_3$—NiO—ZnO catalyst upon $C_4F_8$ was investigated in the same manner as in Example 13. The $Al_2O_3$—NiO—ZnO catalyst used for the test was prepared in the following manner:

Boehmite powders (PURAL SB) were dried at 120° C. for one hour. 200 g of the resulting dried powders were admixed with 210.82 g of nickel nitrate hexahydrate and 152.31 g of zinc nitrate hexahydrate, and the mixture was kneaded while adding pure water thereto. After the kneading, the kneaded mixture was dried at 250°–300° C. for about 2 hours and then fired at 700° C. for 2 hours. The fired product was pulverized and sieved to obtain grains having grain sizes of 0.5–1 mm. The resulting grain composition for catalyst was in atomic ratios of Al:Ni=80:20 and Al:Zn=85:15 and in a weight ratio of $Al_2O_3$:NiO:ZnO=60.7:22.2:17.1.

Figure 13:
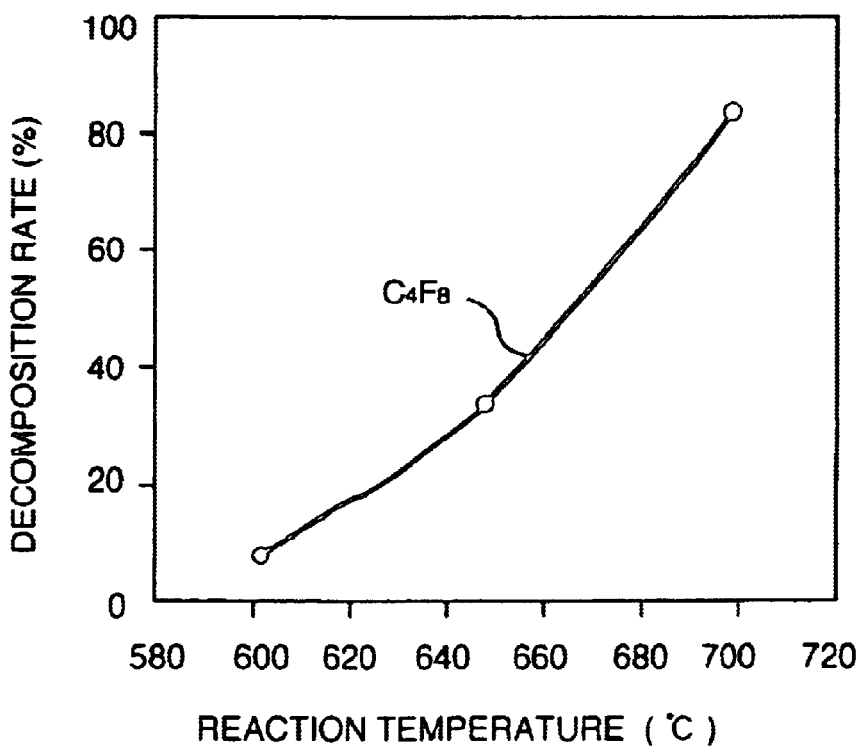
FIG. 13 is a graph showing relations between reaction temperature and decomposition rate of $C_4F_8$ by an $Al_2O_3$—NiO—ZnO catalyst.

FIG. 13 shows decomposition rates at various reaction temperatures, where the decomposition rate of $C_4F_8$ was determined by FID gas chromatography.

What is claimed is:

1. A process for treating a gas, comprising:
    contacting a gas stream containing at least one compound consisting of (a) carbon and fluorine, (b) carbon, hydrogen, and fluorine, (c) carbon, hydrogen, fluorine, and oxygen, (d) $SF_6$, and (e) $NF_3$, with a catalyst at a temperature of 400 to 800° C. in the presence of steam vapor, said catalyst comprising aluminum oxide as an active component and zinc oxide; and
    decomposing the at least one compound by hydrolysis and producing a treated gas containing hydrogen fluoride and an acidic compound.

2. A process according to claim 1, further comprising washing the treated gas with water to remove the hydrogen fluoride and the acidic compound.

3. A process according to claim 1, further comprising neutralizing the treated gas with an alkaline solution or slurry to neutralize the hydrogen fluoride and the acidic compound.

4. A process according to claim 1, further comprising washing the treated gas with water and subsequently contacting the water that has absorbed the hydrogen fluoride with an alkaline solution or slurry.

5. A process according to claim 1, wherein the catalyst comprises 22 to 40.6% by weight zinc oxide.

6. A process according to claim 1, wherein the catalyst further comprises nickel oxide.

7. A process according to claim 5, wherein the catalyst consists essentially of alumina and zinc oxide.

8. A process according to claim 1, wherein the at least one compound is at least one compound selected from the group consisting of $CF_4$, $C_2F_6$, $C_3F_8$, $C_4F_8$, $C_5F_8$, $CHF_3$, $CH_2F_2$, $CH_3F$, $C_2HF_5$, $C_2H_2F_4$, $C_2H_3F_3$, $CH_2H_4F_2$, $C_2H_5F$, $CH_2OCF_2$, $SF_6$, and $NF_3$.

9. A process according to claim 1, wherein the at least one compound is at least one compound selected from the group consisting of $CF_4$, $C_2F_6$, $C_3F_8$, $C_4F_8$, $C_5F_8$, $CHF_3$, $CH_2F_2$, $CH_3F$, $C_2HF_5$, $C_2H_2F_4$, $C_2H_3F_3$, $C_2H_4F_2$, $C_2H_5F$, $SF_6$, and $NF_3$.

10. A process for treating a fluorine compound-containing gas, comprising:

contacting a gas stream containing at least one compound consisting of (a) carbon and fluorine, (b) carbon, hydrogen and fluorine, (c) carbon, hydrogen, oxygen and fluorine, (d) $SF_6$, and (e) $NF_3$, with a catalyst comprising alumina as an active component and zinc oxide, said catalyst in the form of a composite oxide of alumina and zinc oxide;

adding steam or a reaction gas containing steam and oxygen to the gas stream; and effecting a hydrolysis reaction between the at least one compound and the steam, thereby producing a treated gas containing hydrogen fluoride and an acidic compound.

11. A process according to claim 10, further comprising washing the treated gas with water to remove the hydrogen fluoride and the acidic compound, wherein the acidic compound is selected from the group consisting of $CO_2$, NO, and $SO_3$.

12. A process according to claim 10, further comprising washing the treated gas with an alkaline solution or slurry to remove the hydrogen fluoride and the acidic compound.

13. A process according to claim 10, further comprising washing the treated gas with water and contacting the water that has absorbed the hydrogen fluoride and the acidic compound with an alkaline solution or slurry.

14. A process according to claim 10, wherein the catalyst comprises an amount of 22 to 40.6% by weight of zinc oxide.

15. A process according to claim 10, wherein the catalyst further comprises nickel oxide, the balance being alumina.

16. A process according to claim 14, wherein the catalyst consists essentially of alumina and zinc oxide.

17. A process according to claim 10, wherein the at least one compound is at least one compound selected from the group consisting of $CF_4$, $C_2F_6$, $C_3F_8$, $C_4F_8$, $C_5F_8$, $CHF_3$, $CH_2F_2$, $CH_3F$, $C_2HF_5$, $C_2H_2F_4$, $C_2H_3F_3$, $C_2H_4F_2$, $C_2H_5F$, $CH_2OCF_2$, $SF_6$, and $NF_3$.

18. A process according to claim 10, wherein the at least one compound is at least one compound selected from the group consisting of $CF_4$, $C_2F_6$, $C_3F_8$, $C_4F_8$, $C_5F_8$, $CHF_3$, $CH_2F_2$, $CH_3F$, $C_2HF_5$, $C_2H_2F_4$, $C_2H_3F_3$, $C_2H_4F_2$, $C_2H_5F$, $SF_6$, and $NF_3$.

19. A method of treating a gas containing a perfluoro-compound, comprising:

contacting the gas at a temperature of 400 to 800° C. with a catalyst comprising aluminum oxide and zinc oxide in the presence of steam, whereby the perfluoro-compound is decomposed by hydrolysis to produce a treated gas containing hydrogen fluoride; and contacting the treated gas with water to absorb hydrogen fluoride from the treated gas.

20. A process according to claim 19, wherein the perfluoro-compound is at least one compound selected from the group consisting of $CF_4$, $CHF_3$, $C_2F_6$, $C_3F_8$, $C_4F_8$, $SF_6$ and $NF_3$.

21. A process according to claim 19, wherein the catalyst comprises an amount of 22 to 40.6% by weight of zinc oxide.

22. A process according to claim 19, wherein the catalyst further comprises nickel oxide, the balance being alumina.

23. A process according to claim 21, wherein the catalyst consists essentially of alumina and zinc oxide.

* * * * *